(No Model.)
J. S. POPE.
PAD FOR HORSE COLLARS.
No. 366,027. Patented July 5, 1887.
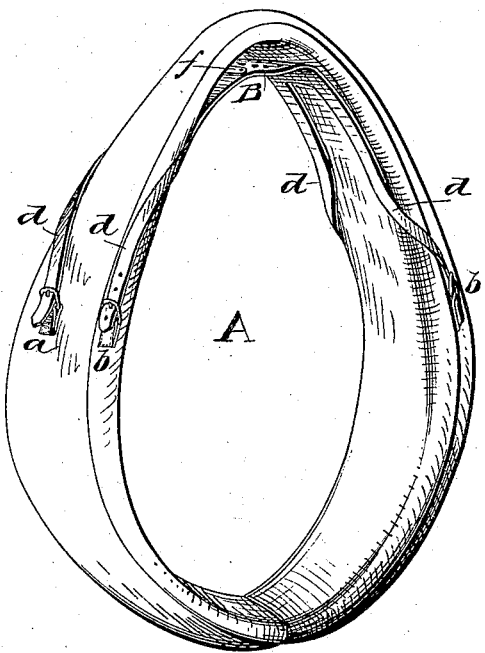
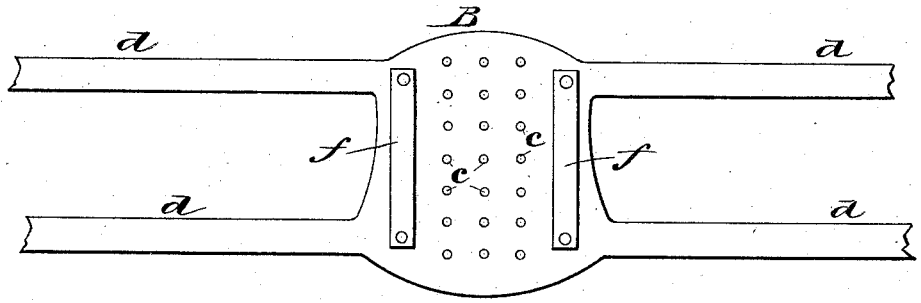
WITNESSES:
INVENTOR:
J. S. Pope
BY Munn & Co.
ATTORNEYS.

UNITED STATES PATENT OFFICE.

JOHN S. POPE, OF MADISON, DAKOTA TERRITORY.

PAD FOR HORSE-COLLARS.

SPECIFICATION forming part of Letters Patent No. 366,027, dated July 5, 1887.

Application filed April 20, 1887. Serial No. 235,485. (No model.)

*To all whom it may concern:*

Be it known that I, JOHN S. POPE, of Madison, in the county of Lake and Territory of Dakota, have invented a new and useful Improvement in Pads for Horse-Collars, of which the following is a full, clear, and exact description.

Reference is to be had to the accompanying drawings, forming a part of this specification, in which similar letters of reference indicate corresponding parts in both the figures.

Figure 1 is a perspective view of a horse-collar having my invention applied thereto, and Fig. 2 is an enlarged plan view of the pad removed from the collar.

The invention will be first described in connection with the drawings, and then pointed out in the claims.

The collar A is of the usual form and construction, except that it is provided with the buckles $a\ b$ on each side and at each side of the hame-grooves. These buckles are located at or about the center of draft upon the collar and serve to suspend the collar from the pad B, the straps $d\ d$ of which are attached to the buckles, as shown in Fig. 1. The pad B is made of a single piece of leather or other suitable material, and is stiffened at the back by two strips of sheet metal or steel, $f$. The pad is attached to the collar so that it supports the whole weight of the collar and leaves a small air-space between the pad and the top of the collar, and the pad may be perforated with numerous small holes, $c$, if desired, to admit a free circulation of air to the horse's neck. By suspending the collar from the pad the collar is free to turn with the movement of the horse's shoulders without moving the pad, and as the collar does not touch the top of the horse's neck there will be no chafing and all danger of galling the horse's neck is obviated.

Having thus described my invention, what I claim as new, and desire to secure by Letters Patent, is—

1. The pad B, provided with the straps $d$, and the stiffening-pieces $f$ at the upper surface, substantially as described.

2. The collar A, provided with the buckles $a\ b$ at each side, near the center of draft, in combination with the pad B, provided with straps $d\ d$, substantially as and for the purposes set forth.

JOHN S. POPE.

Witnesses:
J. A. TROW,
WM. R. GILLESPIE.